US012628065B2

(12) United States Patent (10) Patent No.: US 12,628,065 B2
Van Phan et al. (45) Date of Patent: May 12, 2026

(54) U2U RELAY UE-INITIATED DEDICATED RELAY DISCOVERY FOR SUPPORTING DIRECT-TO-INDIRECT PATH SWITCH

(71) Applicant: Nokia Technologies Oy, Espoo (FI)

(72) Inventors: Vinh Van Phan, Oulu (FI); Ling Yu, Espoo (FI); Gyorgy Tamas Wolfner, Budapest (HU)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 18/452,138

(22) Filed: Aug. 18, 2023

(65) Prior Publication Data

US 2024/0114428 A1      Apr. 4, 2024

Related U.S. Application Data

(60) Provisional application No. 63/412,765, filed on Oct. 3, 2022.

(51) Int. Cl.
H04W 40/24          (2009.01)
(52) U.S. Cl.
CPC ....... H04W 40/248 (2013.01); H04W 40/246 (2013.01)
(58) Field of Classification Search
CPC . H04W 40/248; H04W 40/246; H04W 8/005; H04W 16/18; H04W 36/0058; H04W 92/18; H04W 88/04; H04W 76/14
See application file for complete search history.

(56) References Cited

U.S. PATENT DOCUMENTS

| | | | | |
|---|---|---|---|---|
| 12,143,223 B2* | 11/2024 | Huang | .............. | H04L 5/0033 |
| 12,294,484 B2* | 5/2025 | Kuo | .............. | H04W 76/34 |
| 2022/0103997 A1* | 3/2022 | Kang | .............. | H04W 8/005 |
| 2022/0110010 A1 | 4/2022 | Lu et al. | | |
| 2022/0263605 A1* | 8/2022 | Huang | .............. | H04W 72/04 |
| 2023/0276297 A1* | 8/2023 | Basu Mallick | ....... | H04L 1/1896 |
| | | | | 370/229 |
| 2023/0300713 A1* | 9/2023 | Hoang | .............. | H04W 40/24 |
| | | | | 370/254 |
| 2023/0328829 A1* | 10/2023 | Guo | .............. | H04W 76/19 |
| | | | | 370/329 |
| 2024/0414513 A1* | 12/2024 | Paladugu | .............. | H04W 8/005 |
| 2025/0106728 A1* | 3/2025 | Cheng | .............. | H04W 40/22 |

OTHER PUBLICATIONS

"Revised WID on NR sidelink relay enhancements", 3GPP TSG RAN Meeting #96, RP-221262, Agenda: 9.3.2.4, LG Electronics, Jun. 6-9, 2022, 6 pages.

(Continued)

*Primary Examiner* — Kibrom T Hailu
(74) *Attorney, Agent, or Firm* — Barta Jones, PLLC

(57)          ABSTRACT

A UE operates in a system where a source UE communicates using SL communications with a destination UE and detects a SL coverage issue with the sidelink communications between the source and destination UEs. The UE sends, to at least the destination UE, an announcement concerning at least one of the sidelink coverage issue or the UE being available as a relay UE candidate for an indirect path to the destination UE. The destination UE receives the announcement and communicates with the UE to set up and use the indirect path.

5 Claims, 8 Drawing Sheets

(56) References Cited

OTHER PUBLICATIONS

"3rd Generation Partnership Project; Technical Specification Group Radio Access Network; NR; Medium Access Control (MAC) protocol specification (Release 17)", 3GPP TS 38.321, V17.1.0, Jun. 2022, pp. 1-241.

"3rd Generation Partnership Project; Technical Specification Group Radio Access Network; NR; Multiplexing and channel coding (Release 17)", 3GPP TS 38.212, V17.3.0, Sep. 2022, pp. 1-201.

"Clarifications on the scope of SL based U2U Relay", 3GPP TSG-RAN WG2 Meeting #119bis Electronic, R2-2210339, Agenda: 8.9.2, Nokia, Oct. 10-21, 2022, 5 pages.

"3rd Generation Partnership Project; Technical Specification Group Services and System Aspects; Proximity based Services (ProSe) in the 5G System (5GS) (Release 18)", 3GPP TS 23.304, V18.2.0, Jun. 2023, pp. 1-142.

Extended European Search Report received for corresponding European Patent Application No. 23192057.0, dated Feb. 9, 2024, 9 pages.

"NR Sidelink Relaying Discovery", 3GPP TSG RAN WG2 Meeting #113-bis-e, R2-2103010, Agenda: 8.7.2, Fraunhofer IIS, Apr. 12-20, 2021, 3 pages.

"Initiation of relaying operation", 3GPP TSG-RAN WG2 Meeting #111 electronic, R2-2006573, Agenda: 8.7.4, MediaTek Inc, Aug. 17-28, 2020, pp. 1-8.

"Introduction of Rel-17 Sidelink Relay", 3GPP TSG-RAN WG2 Meeting #116bis Electronic, R2-2201725, MediaTek Inc, Jan. 17-25, 2022, 42 pages.

* cited by examiner

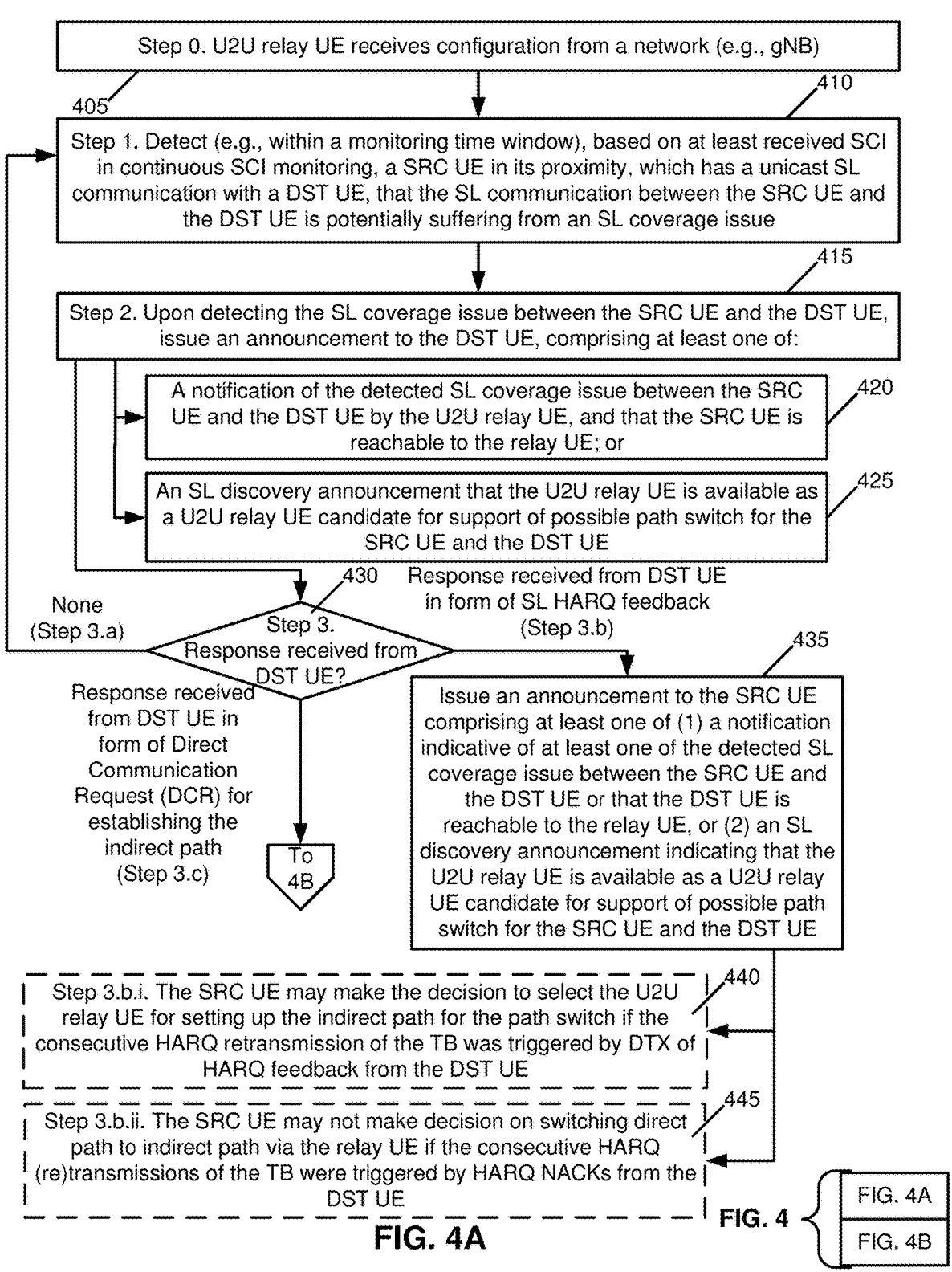

Step 0. U2U relay UE receives configuration from a network (e.g., gNB)

405    410

Step 1. Detect (e.g., within a monitoring time window), based on at least received SCI in continuous SCI monitoring, a SRC UE in its proximity, which has a unicast SL communication with a DST UE, that the SL communication between the SRC UE and the DST UE is potentially suffering from an SL coverage issue

415

Step 2. Upon detecting the SL coverage issue between the SRC UE and the DST UE, issue an announcement to the DST UE, comprising at least one of:

420

A notification of the detected SL coverage issue between the SRC UE and the DST UE by the U2U relay UE, and that the SRC UE is reachable to the relay UE; or

425

An SL discovery announcement that the U2U relay UE is available as a U2U relay UE candidate for support of possible path switch for the SRC UE and the DST UE 430    Response received from DST UE in form of SL HARQ feedback (Step 3.b)

None (Step 3.a)

Step 3. Response received from DST UE?

435

Response received from DST UE in form of Direct Communication Request (DCR) for establishing the indirect path (Step 3.c)

To 4B

Issue an announcement to the SRC UE comprising at least one of (1) a notification indicative of at least one of the detected SL coverage issue between the SRC UE and the DST UE or that the DST UE is reachable to the relay UE, or (2) an SL discovery announcement indicating that the U2U relay UE is available as a U2U relay UE candidate for support of possible path switch for the SRC UE and the DST UE

440

Step 3.b.i. The SRC UE may make the decision to select the U2U relay UE for setting up the indirect path for the path switch if the consecutive HARQ retransmission of the TB was triggered by DTX of HARQ feedback from the DST UE

445

Step 3.b.ii. The SRC UE may not make decision on switching direct path to indirect path via the relay UE if the consecutive HARQ (re)transmissions of the TB were triggered by HARQ NACKs from the DST UE

From
4A

450

Establish the relay connection with the DST UE

455

Initiate a DCR and indirect path establishment with the SRC UE

460

Notify the SRC UE as in the 3.b option (see block 435), along with the DCR and establishment of the indirect path For a user equipment operating in a system where a source user equipment communicates using sidelink communications with a destination user equipment, detect by the user equipment a sidelink coverage issue with the sidelink communications between the source user equipment and the destination user equipment _/610

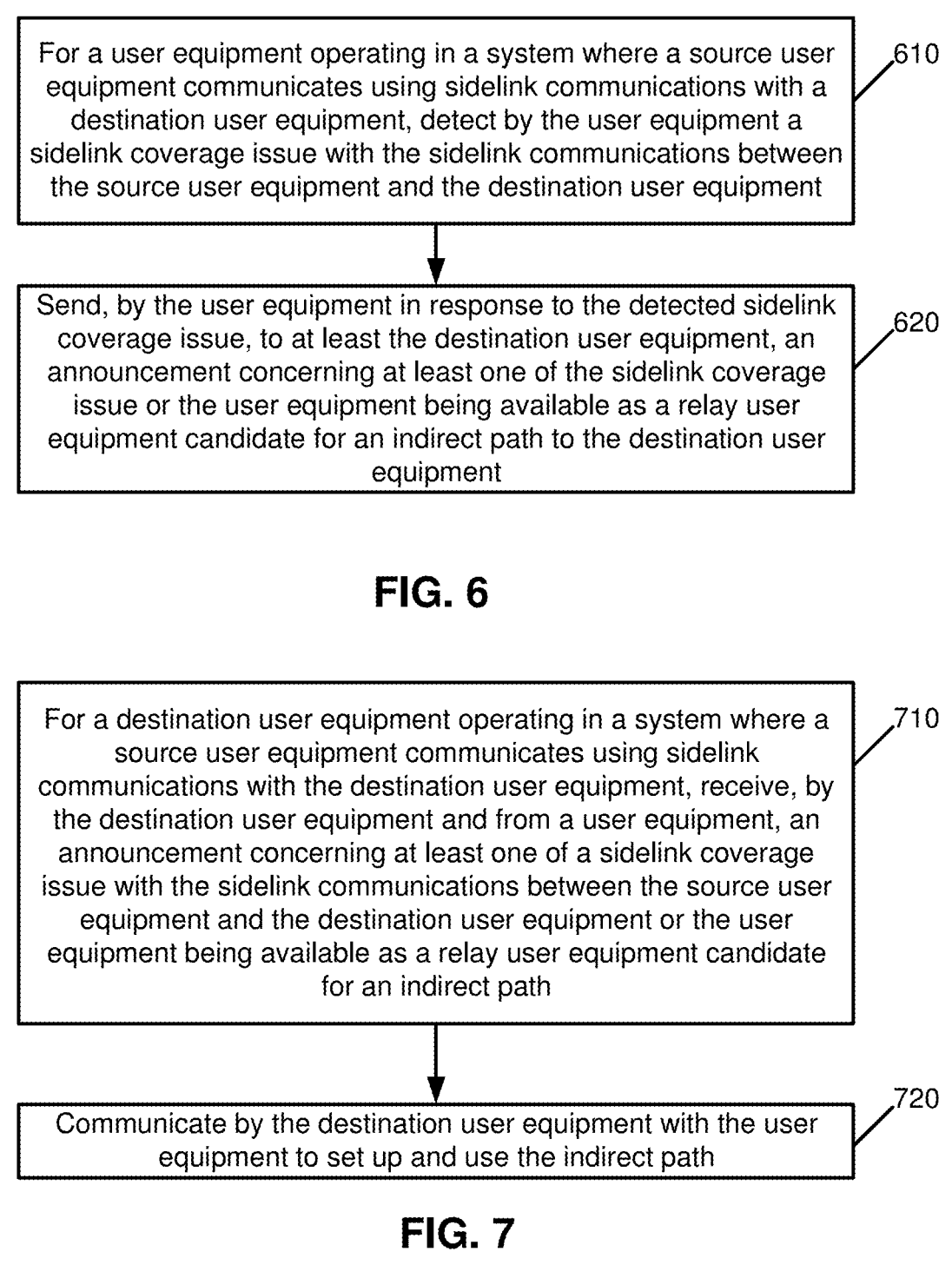

Send, by the user equipment in response to the detected sidelink coverage issue, to at least the destination user equipment, an announcement concerning at least one of the sidelink coverage issue or the user equipment being available as a relay user equipment candidate for an indirect path to the destination user equipment _/620

FIG. 6

For a destination user equipment operating in a system where a source user equipment communicates using sidelink communications with the destination user equipment, receive, by the destination user equipment and from a user equipment, an announcement concerning at least one of a sidelink coverage issue with the sidelink communications between the source user equipment and the destination user equipment or the user equipment being available as a relay user equipment candidate for an indirect path _/710

Communicate by the destination user equipment with the user equipment to set up and use the indirect path _/720

FIG. 7

U2U RELAY UE-INITIATED DEDICATED RELAY DISCOVERY FOR SUPPORTING DIRECT-TO-INDIRECT PATH SWITCH

TECHNICAL FIELD

Exemplary embodiments herein relate generally to wireless communications and, more specifically, relates to Proximity Service (ProSe) sidelink communications in general including V2X (vehicle-to-everything), public safety, wearable and personal IoT (Internet of things) or industrial IoT applications.

BACKGROUND

Vehicle-to-Everything (V2X) is a vehicular communication system that supports the transfer of information from a vehicle to moving parts of the traffic system that may affect the vehicle. The main purpose of V2X technology is to improve road safety, energy savings, and traffic efficiency on the roads.

In a V2X system, there is a wireless network, typically a cellular network, that communicates with the wireless devices, typically referred to as user equipment (UEs), that are in or part of the vehicles. Additionally, there is an aspect where the wireless devices communicate between themselves, using a "sidelink", which is a wireless link between the devices. This allows UEs in the vehicles to communicate, such as for traffic, emergency operations, and more.

The V2X is also more complex than just moving vehicles. For example, UE-based road side units (RSUs) are good examples which are considered as designated UE devices that can be deployed for facilitating V2X communications.

V2X and the sidelink communications there are one set of technologies under Proximity Service (ProSe) sidelink communications in general, which includes V2X along with public safety, wearable and personal IoT (Internet of things) or industrial IoT applications.

As an example, in wearables and personal IoT, a smart phone may act as a UE hub for other devices. As another example, in industrial IoT, there may be such a master device in the middle for facilitating communications between sensor or actuator devices.

There are issues in these types of systems where UEs are communicating with other UEs but move out of range of those UEs or otherwise have issues on the sidelink with the other UEs.

BRIEF SUMMARY

This section is intended to include examples and is not intended to be limiting.

In an exemplary embodiment, a method is disclosed that includes for a user equipment operating in a system where a source user equipment communicates using sidelink communications with a destination user equipment, detecting by the user equipment a sidelink coverage issue with the sidelink communications between the source user equipment and the destination user equipment; and sending, by the user equipment in response to the detected sidelink coverage issue, to at least the destination user equipment, an announcement concerning at least one of the sidelink coverage issue or the user equipment being available as a relay user equipment candidate for an indirect path to the destination user equipment.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: for a user equipment operating in a system where a source user equipment communicates using sidelink communications with a destination user equipment, detecting by the user equipment a sidelink coverage issue with the sidelink communications between the source user equipment and the destination user equipment; and sending, by the user equipment in response to the detected sidelink coverage issue, to at least the destination user equipment, an announcement concerning at least one of the sidelink coverage issue or the user equipment being available as a relay user equipment candidate for an indirect path to the destination user equipment.

An exemplary computer program product includes a computer-readable storage medium bearing instructions that, when executed by an apparatus, cause the apparatus to perform at least the following: for a user equipment operating in a system where a source user equipment communicates using sidelink communications with a destination user equipment, detecting by the user equipment a sidelink coverage issue with the sidelink communications between the source user equipment and the destination user equipment; and sending, by the user equipment in response to the detected sidelink coverage issue, to at least the destination user equipment, an announcement concerning at least one of the sidelink coverage issue or the user equipment being available as a relay user equipment candidate for an indirect path to the destination user equipment.

In another exemplary embodiment, an apparatus comprises means for performing: for a user equipment operating in a system where a source user equipment communicates using sidelink communications with a destination user equipment, detecting by the user equipment a sidelink coverage issue with the sidelink communications between the source user equipment and the destination user equipment; and sending, by the user equipment in response to the detected sidelink coverage issue, to at least the destination user equipment, an announcement concerning at least one of the sidelink coverage issue or the user equipment being available as a relay user equipment candidate for an indirect path to the destination user equipment.

In an exemplary embodiment, a method is disclosed that includes for a destination user equipment operating in a system where a source user equipment communicates using sidelink communications with the destination user equipment, receiving, by the destination user equipment and from a user equipment, an announcement concerning at least one of a sidelink coverage issue with the sidelink communications between the source user equipment and the destination user equipment or the user equipment being available as a relay user equipment candidate for an indirect path; and communicating by the destination user equipment with the user equipment to set up and use the indirect path.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: for a destination user equipment operating in a system where a source user equipment communicates using sidelink communications with the destination user equipment, receiving, by the destination user equipment and from a user equipment, an announcement concerning at least one of a sidelink coverage issue with the sidelink communications between the source user equipment and the destination user equipment or the user equipment being available as a relay user equipment candidate for an indirect path; and communicating by the destination user equipment with the user equipment to set up and use the indirect path.

An exemplary computer program product includes a computer-readable storage medium bearing instructions that, when executed by an apparatus, cause the apparatus to perform at least the following: for a destination user equipment operating in a system where a source user equipment communicates using sidelink communications with the destination user equipment, receiving, by the destination user equipment and from a user equipment, an announcement concerning at least one of a sidelink coverage issue with the sidelink communications between the source user equipment and the destination user equipment or the user equipment being available as a relay user equipment candidate for an indirect path; and communicating by the destination user equipment with the user equipment to set up and use the indirect path.

In another exemplary embodiment, an apparatus comprises means for performing: for a destination user equipment operating in a system where a source user equipment communicates using sidelink communications with the destination user equipment, receiving, by the destination user equipment and from a user equipment, an announcement concerning at least one of a sidelink coverage issue with the sidelink communications between the source user equipment and the destination user equipment or the user equipment being available as a relay user equipment candidate for an indirect path; and communicating by the destination user equipment with the user equipment to set up and use the indirect path.

BRIEF DESCRIPTION OF THE DRAWINGS

In the attached Drawing Figures:

FIG. 6 is a logic flow diagram performed by a U2U relay UE for U2U relay UE-initiated dedicated relay discovery for supporting direct-to-indirect path switch; and FIG. 7 is a logic flow diagram performed by a DST UE for U2U relay UE-initiated dedicated relay discovery for supporting direct-to-indirect path switch.

DETAILED DESCRIPTION OF THE DRAWINGS

Figure 1:
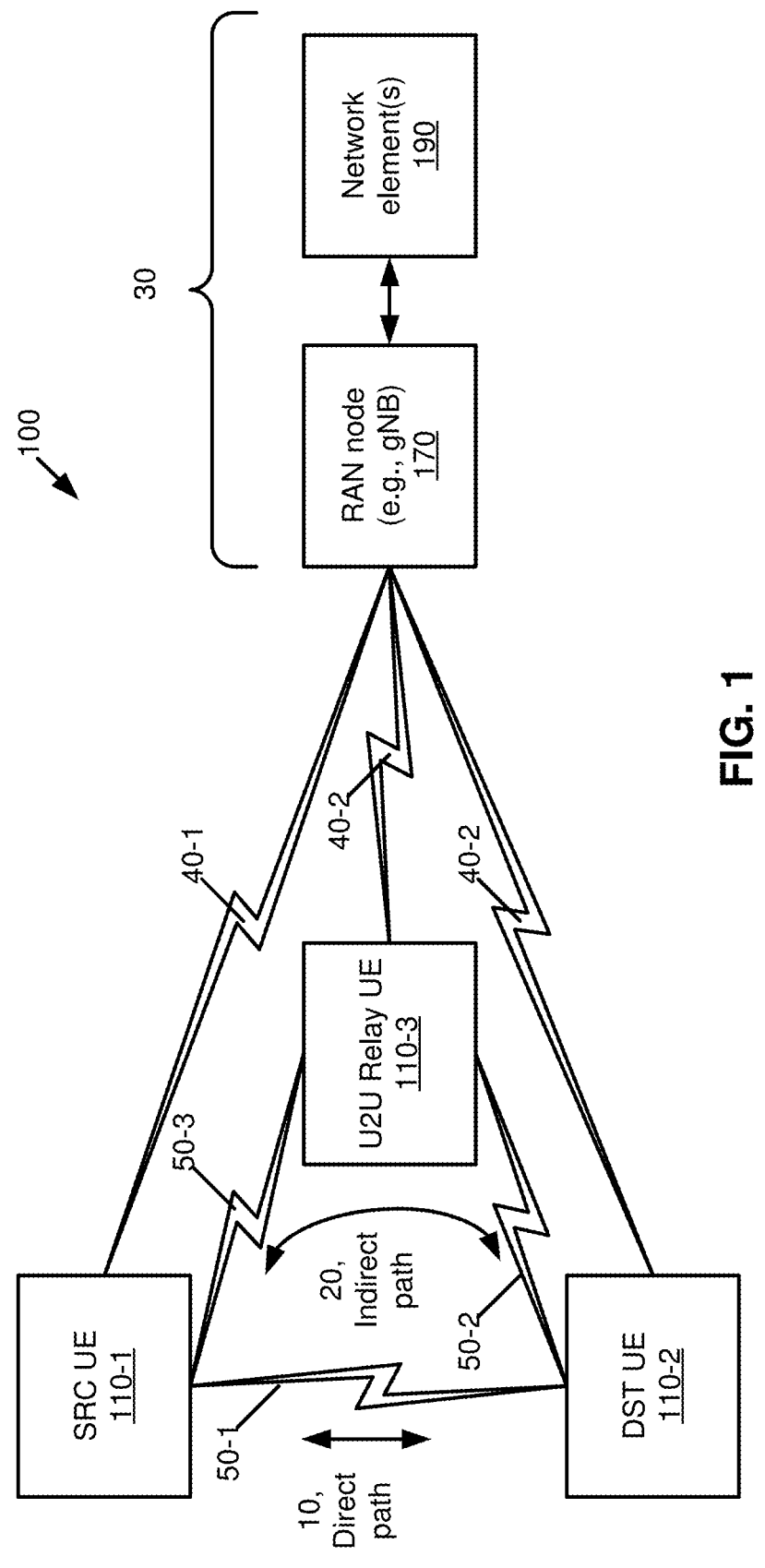
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "I" may be interpreted as either "or", "and", or "both".

The exemplary embodiments herein describe techniques for U2U relay UE-Initiated Dedicated relay Discovery for Supporting Direct-To-Indirect Path Switch. Additional description of these techniques is presented after a system into which the exemplary embodiments may be used is described.

Turning to FIG. 1, this figure shows a block diagram of one possible and non-limiting exemplary system 100 in which the exemplary embodiments may be practiced. The system 100 includes a wireless system 30, e.g., a cellular system, and multiple UEs 110, including 110-1, 110-2, and 110-3. In this example, the wireless system 30 is a cellular system comprising a RAN node 170 and one or more network elements 190.

The RAN node 170 may be, for instance, a base station for 5G, also called New Radio (NR), and commonly referred to as a gNB. In fact, the term "gNB" is used herein, though this is but one example of a base station. For instance, in 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) and distributed unit(s) (DUs) (gNB-DUs). The RAN node 170 may also be an eNB (evolved NodeB) base station, for LTE (long term evolution), or any other suitable base station.

There are multiple possible network elements 190, which may include core network functionality, and which may provide connectivity with a data network (not shown) such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported by the network element(s) 190, and note that both 5G and LTE functions might be supported.

In this example, there is a source (SRC) UE 110-1 and a destination (DST) UE 110-2. There is a direct path 10 using a radio link 50-1 between the SRC UE 110-1 and the DST UE 110-2. Another possible path is indirect path 20, which is between the SRC UE 110-1 and the DST UE 110-2, but passes through a UE-to-UE (U2U) relay UE 110-3, using radio link 50-3 between the SRC UE 110-1 and the U2U relay UE 110-3 and a radio link 50-2 between the U2U relay UE 110-3 and the DST UE 110-2. The UEs 110 may also communicate with the gNB 170 using corresponding radio links 40-1, 40-2, and 40-3.

Figure 1A:
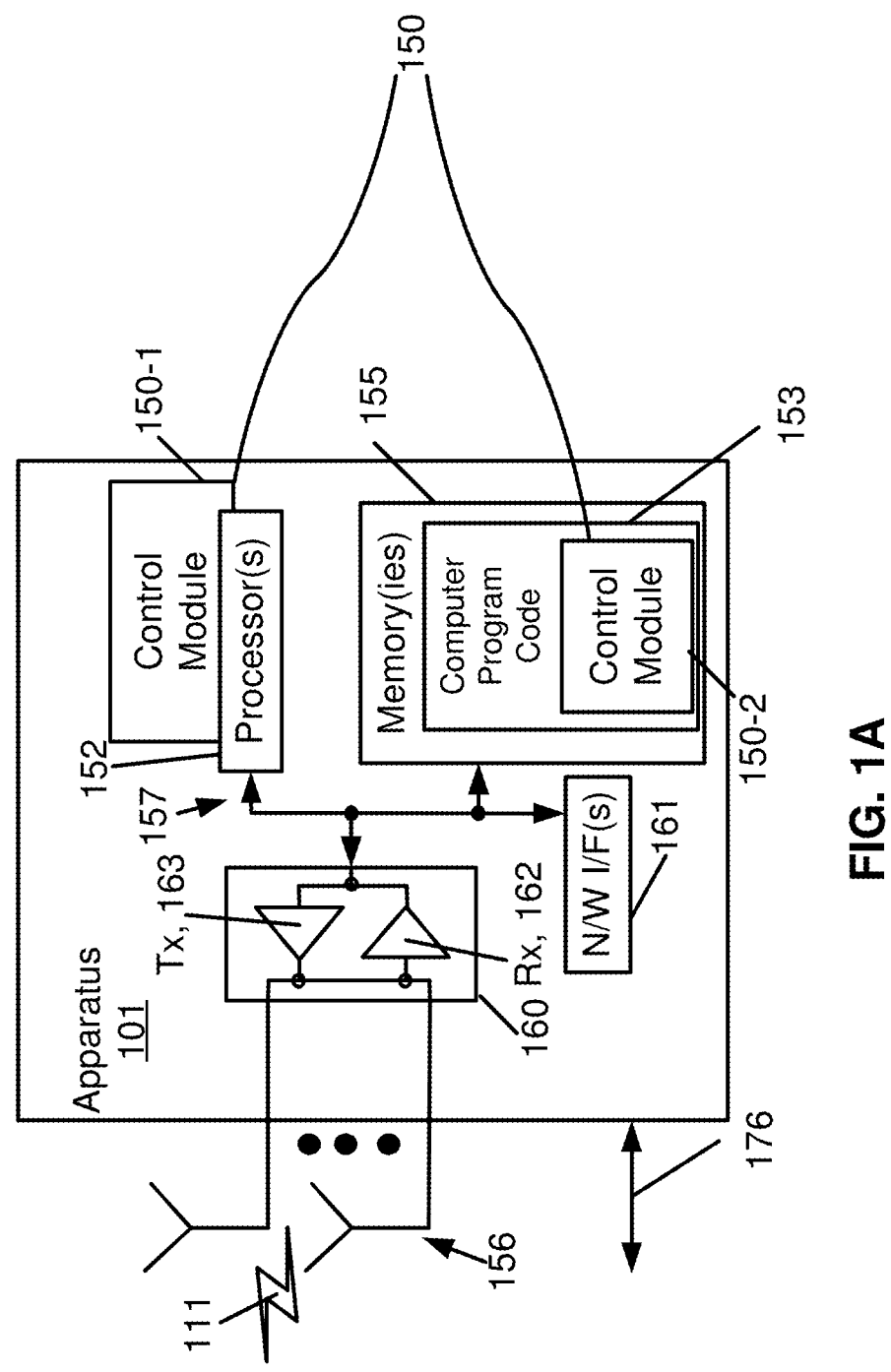
FIG. 1A illustrates a possible apparatus that may be used to implement one of the nodes in FIG. 1, in accordance with an exemplary embodiment.

FIG. 1A illustrates a possible apparatus that may be used to implement one of the nodes 110, 170, or 190 in FIG. 1, in accordance with an exemplary embodiment. The apparatus 101 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 156, which communicates using a radio link 111. The radio link 111 could be radio link 40 or radio link 50 in FIG. 1. The one or more memories 155 include computer program code 153.

The apparatus 101 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the apparatus 101 to perform one or more of the operations as described herein.

The one or more network interfaces 161 communicate over a network such as via the wired link(s) 176. The wired link(s) 176 may be electrical, such as ethernet, or optical, or any other non-wireless links. Two or more apparatuses 101 may also communicate using, e.g., link(s) 176 (and/or via radio link 111). The one or more buses 157 may be address, data, or control buses, and may include any interconnection mechanism, such as a series of lines on a motherboard or integrated circuit, fiber optics or other optical communication equipment, wireless channels, and the like.

Having thus introduced one suitable but non-limiting technical context for the practice of the exemplary embodiments, the exemplary embodiments will now be described with greater specificity.

As described above, the V2X system is a vehicular communication system that supports the transfer of information from a vehicle to moving parts of the traffic system that may affect the vehicle. This has been under study, such as through 3GPP Rel-18 sidelink (SL) based UE-to-UE (U2U) relay of which the objectives are described in LG Electronics, "Revised WID on NR sidelink relay enhancements", RP-221262, 3GPP TSG RAN Meeting #96, Budapest, Hungary, Jun. 6-9, 2022 as follows (the cited text is between opening and closing quotation marks).

"The objective of this work item is to specify solutions that are needed to enhance NR Sidelink relay for the V2X, public safety and commercial use cases.

1. Specify Mechanisms to Support Single-Hop Layer-2 and Layer-3 UE-to-UE Relay (i.e., Source UE->Relay UE->Destination UE) for Unicast [RAN2, RAN3, RAN4].

A. Common Part for Layer-2 and Layer-3 Relay to be Prioritized Until RAN #98 i. relay discovery and (re)selection [RAN2, RAN4]

ii. Signalling support for relay and remote UE authorization if SA2 concludes it is needed [RAN3]

B. Layer-2 Relay Specific Part i. UE-to-UE relay adaptation layer design [RAN2]

ii. Control plane procedures [RAN2]

iii. QoS handling if needed, subject to SA2 progress [RAN2]

Note 1A: This work should take into account the forward compatibility for supporting more than one hop in a later release.

Note 1B: A remote UE is connected to only a single relay UE at a given time for a given destination UE."

There are therefore issues for study and for resolution in V2X, including U2U communications via the sidelink. In order to understand issues addressed herein, it is helpful to first describe an overview in this area.

For instance, consider this overview of NR SL communication. 3GPP Rel-16 NR sidelink (SL) has been designed to facilitate a user equipment (UE) to communicate with other nearby UE(s) via direct SL communication. Two resource allocation modes have been specified, and a SL transmitter (Tx) UE is configured with one of them to perform its NR SL transmissions. These modes are denoted as NR SL mode 1 and NR SL mode 2. In mode 1, a sidelink transmission resource is assigned (that is, scheduled) by the network (NW) (e.g., gNB 170) to the SL Tx UE, while a SL Tx UE in mode 2 autonomously selects its SL transmission resources from at least one configured resource pool.

Figure 2:
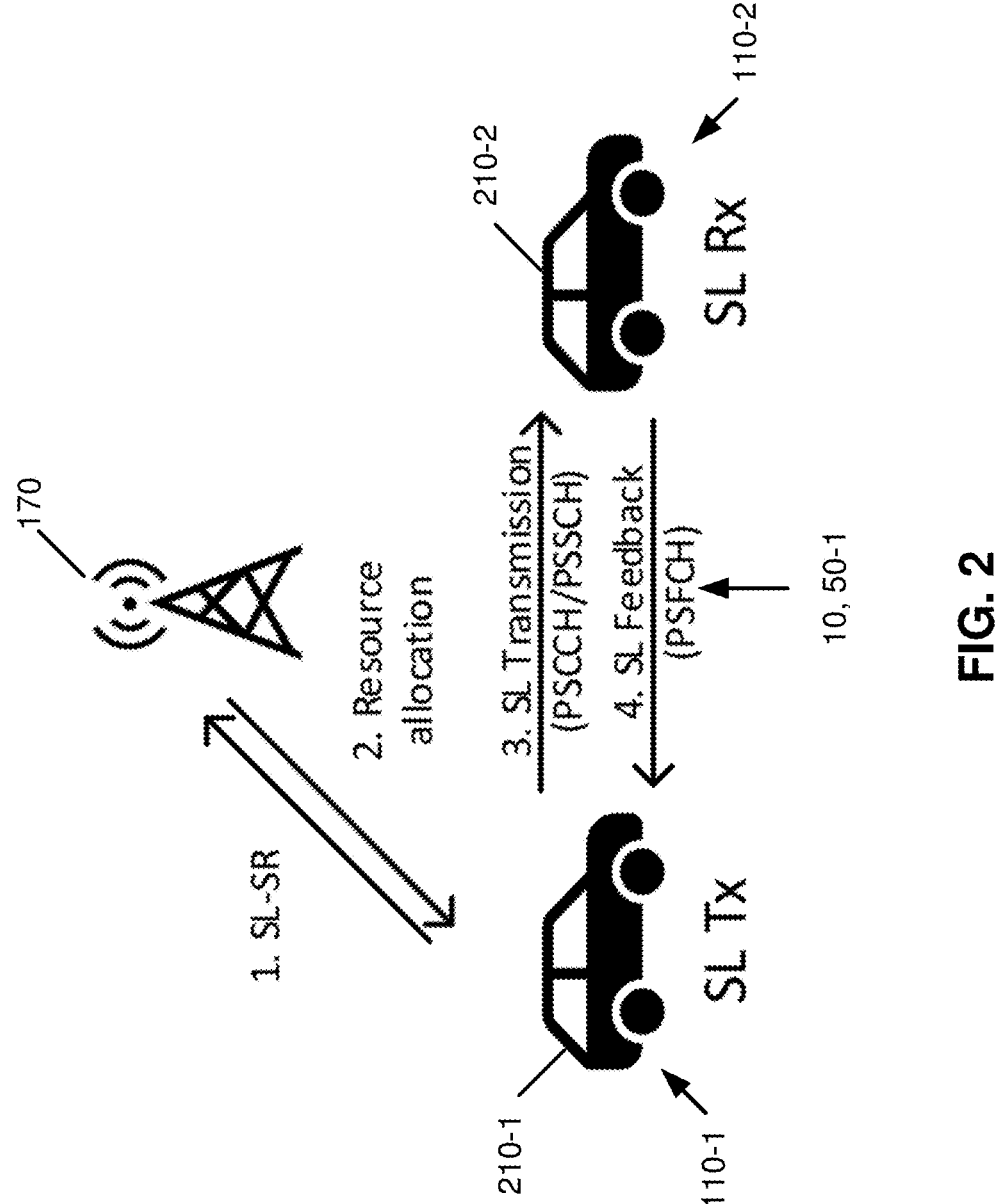
FIG. 2 illustrates Mode 1 for a NR SL resource allocation mode.

In mode 1, where the gNB is responsible for the SL resource allocation, the configuration and operation is similar to the one over the Uu interface. Turn to FIG. 2, which illustrates Mode 1 for a NR SL resource allocation mode. The MAC level details of this procedure are given in section 5.8.3 of 3GPP TS 38.321. In this example, there is a gNB 170 (with a corresponding tower and antenna system) in communication with a SRC UE 110-1 in a vehicle 210-1. The SRC UE 110-1 in step 1 performs a sidelink scheduling request (SL-SR) with the gNB 170. In step 2, the gNB 170 performs resource allocation, which allocates the resources for the communication on the radio link 50-1 and via the direct path 10 between the SRC UE 110-1 and the DST UE 110-2 in the vehicle 210-2, and sends indication of the resource allocation to the SRC UE 110-1. The SRC UE 110-1 is the SL Tx (transmitter), which sends (step 3) an SL transmission (using the allocated resources) on PSCCH and PSSCH to the DST UE 110-2, also referred to as the SL Rx. The DST UE 110-2 responds (step 4) with SL feedback, using PSFCH. The PSFCH for sending (and receiving) the SL feedback by the DST UE (and the SRC UE) is derived from the resource allocation indicated in the SCI that is used for sending the SL transmission by the SRC UE.

Figure 3:
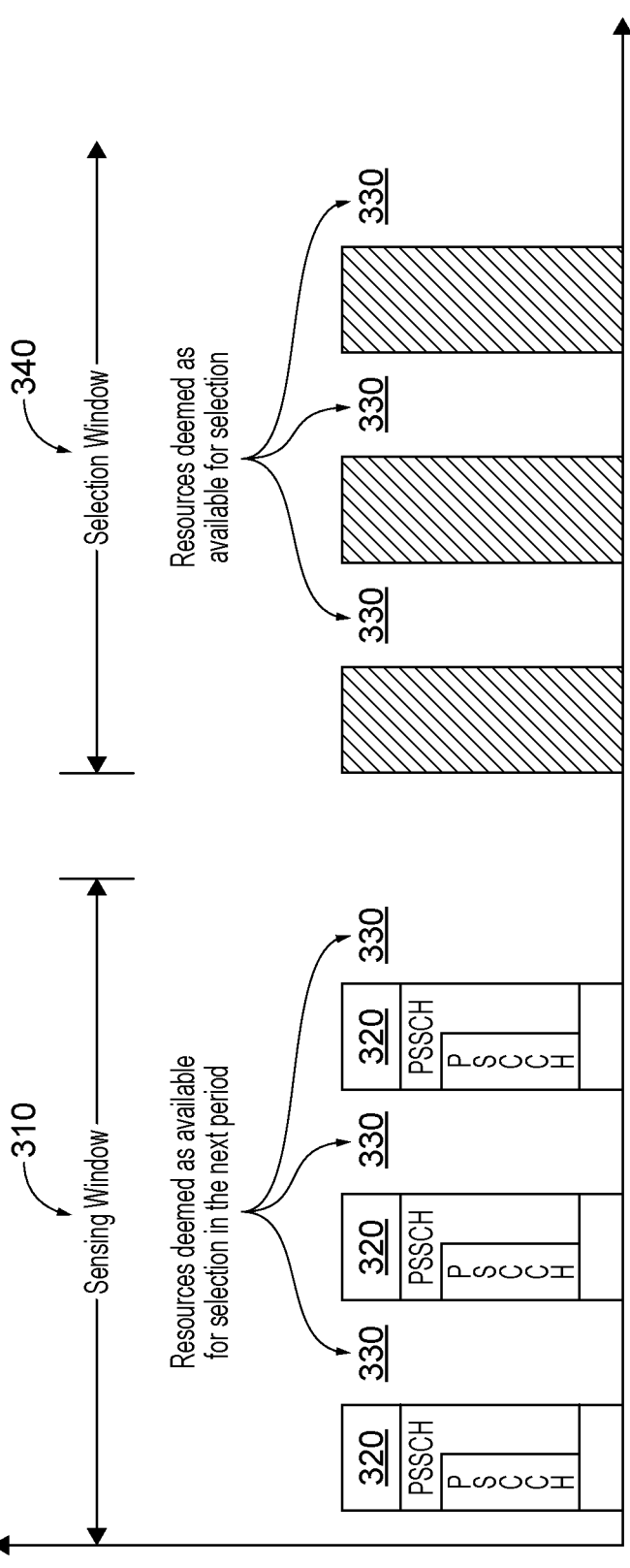
FIG. 3 illustrates Mode 2 for a NR SL resource allocation mode.

In mode 2, the SL UEs 110 perform autonomously the resource selection with the aid of a sensing procedure. FIG. 3 illustrates Mode 2 for a NR SL resource allocation mode. More specifically, a SL Tx UE in NR SL mode 2 first performs a sensing procedure in the sensing window 310 over the configured SL transmission resource pool(s), in order to obtain the knowledge of the reserved resource(s) by other nearby SL Tx UE(s). In this example, resources 320 (including PSSCH and PSCCH) are reserved by nearby SL Tx UE(s). The resources 330 are resources deemed as available for selection in the next period.

Based on the knowledge obtained from sensing, the SL Tx UE may select (in the selection window 340) resource(s) from the available SL resources 330, accordingly.

In order for an SL UE to perform sensing and obtain the necessary information to receive an SL transmission, the UE needs to decode the sidelink control information (SCI). In Rel-16, the SCI associated with a data transmission includes a $1^{st}$-stage SCI and $2^{nd}$-stage SCI, and their contents are standardized in 3GPP TS 38.212.

Concerning Sidelink Control Information (SCI), the SCI follows a two-stage SCI structure, whose main motivation is to support the size difference between the SCIs for various NR-V2X SL service types (e.g., broadcast, groupcast, and unicast).

The $1^{st}$-stage SCI, SCI format 1-A, is carried by PSCCH and contains:

1) information to enable sensing operations; and
2) information needed to determine resource allocation of the PSSCH and to decode $2^{nd}$-stage SCI.

As per Rel-16, the contents of the 1st-stage SCI are described at least in section 8.3.1.1, "SCI format 1-A", from 3GPP TS 38.212 V17.3.0 (2022-09).

The $2^{nd}$-stage SCI, SCI format 2-A and 2-B, is carried by PSSCH (multiplexed with SL-SCH) and contains:

1) Source and destination identities;
2) information to identify and decode the associated SL-SCH TB;
3) control of HARQ feedback in unicast/groupcast; and
4) a trigger for CSI feedback in unicast.

The contents of the $2^{nd}$-stage SCI in Rel-16 are provided in the table shown below:

| SCI Format 2-A | SCI Format 2-B |
| --- | --- |
| HARQ process number - 4 bits. | HARQ process number - 4 bits. |
| New data indicator - 1 bit. | New data indicator - 1 bit. |
| Redundancy version - 2 bits as defined in Table 7.3.1.1.1-2. | Redundancy version - 2 bits as defined in Table 7.3.1.1.1-2. |
| Source ID - 8 bits as defined in clause 8.1 of [6, TS 38.214]. | Source ID - 8 bits as defined in clause 8.1 of [6, TS 38.214]. |
| Destination ID - 16 bits as defined in clause 8.1 of [6, TS 38.214]. | Destination ID - 16 bits as defined in clause 8.1 of [6, TS 38.214]. |
| HARQ feedback enabled/disabled indicator - 1 bit as defined in clause 16.3 of [5, TS 38.213]. | HARQ feedback enabled/disabled indicator - 1 bit as defined in clause 16.3 of [5, TS 38.213]. |
| Cast type indicator - 2 bits as defined in Table 8.4.1.1-1 and in clause 8.1 of [6, TS 38.214]. | Zone ID - 12 bits as defined in clause 5.8.11 of [9, TS 38.331]. |
| CSI request - 1 bit as defined in clause 8.2.1 of [6, TS 38.214] and in clause 8.1 of [6, TS 38.214]. | Communication range requirement 4 bits determined by higher layer parameter sl-ZoneConfigMCR-Index. |

It is expected that a SRC UE 110-1 and a DST UE 110-2 in an SL based unicast communication may use a direct SL communication path, denoted herein as "direct path 10" (see FIG. 1), when being in direct SL proximity of one another, or may use an indirect SL communication path, denoted herein as "indirect path 20", via a U2U relay UE 110-3 when being out of direct SL proximity of one another. Thus, switching between the direct path 10 and indirect path 20 may be expected considering certain mobility or coverage scenarios of the SRC UE 110-1 and DST UE 110-2. For example, the SRC UE may be moving in and out of a basement or a building with its holder being a public-safety officer, while communicating with the DST UE of a commander outside the basement or the building in a public safety mission. The direct path is applicable only when both the SRC UE and the DST UE are out of the basement or building, otherwise the indirect path needs to be used in this example.

The exemplary embodiments herein focus on supporting path switching from a direct path to an indirect path between the SRC UE and the DST UE. It is expected that the SRC UE and the DST UE may need to discover and select a suitable U2U relay UE for the path switch once the direct path is not sufficient for SL communication between the SRC UE and the DST UE. The discovery and selection of the U2U relay UE may be initiated by either the SRC UE or the DST UE. These processes or functions may take a considerable amount of time and resources, depending on availability of U2U relay UE candidates in proximity of both the SRC UE and the DST UE, causing negative performance impacts on service continuity of the SRC UE and DST UE as well as overall SL communication system (e.g., prolonged path-switch latency and therefore increased path-switch failure and increased SL resource consumption).

In order to address these and other issues, the exemplary embodiments herein propose a U2U relay UE initiated mechanism for enabling and facilitating U2U relay UE discovery and selection for support of the path switch from direct path to indirect path between a SRC UE 110-1 and a DST UE 110-2. The exemplary embodiments are based on exploring one or more of the following:

(i) The distributed one-to-many broadcast principle of SL communications standardized in 3GPP, in which SCI is broadcast by Tx UE and individual UE in SL communications, either Tx UE or Rx UE, needs to monitor SCI from all Tx UEs in its proximity continuously for sensing operation or receiving SL communications; and/or (ii) The distributed inter-UE coordination (IUC) principle of SL communications, in which a UE, based on monitoring SCI, may detect certain issue(s) associated with SL transmissions of one or more other UE(s) in its proximity and assist at least one of the one or more other UE(s) to notice and resolve the issue(s) by notifying and providing useful information to the at least one other UE.

Figures 4, 4A, 4B:
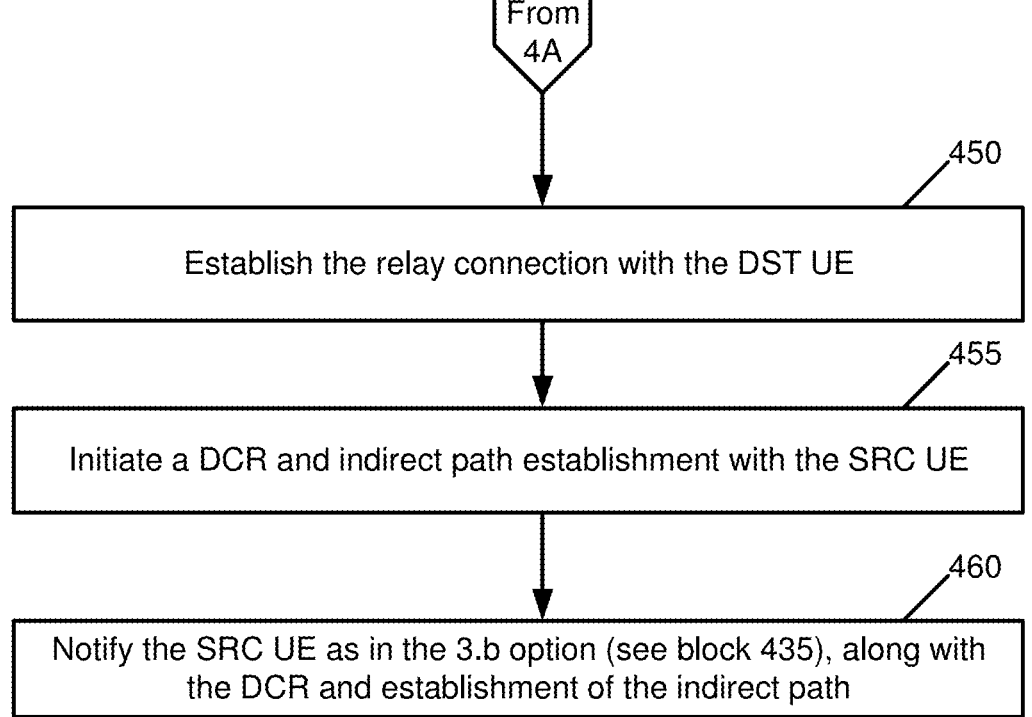
FIG. 4, split over
FIGS. 4A and 4B, is a logic flow diagram for U2U relay UE-initiated dedicated relay discovery for supporting direct-to-indirect path switch, performed by a U2U relay UE.

The proposed mechanisms include one or more of the following steps, described in view of the U2U relay UE. These are described with reference to FIG. 4, which is spread over FIGS. 4A and 4B and is a logic flow diagram for U2U relay UE-initiated dedicated relay discovery for supporting direct-to-indirect path switch, mainly performed by a U2U relay UE. FIG. 4 also illustrates the operation of an exemplary method or methods, a result of execution of computer program instructions embodied on a computer readable memory, functions performed by logic implemented in hardware, and/or interconnected means for performing functions in accordance with exemplary embodiments.

Step 0. The U2U relay UE receives configuration from a network (e.g., gNB). That is, the relay UE 110-3 is configured to perform the actions described below and herein. See block 405. For instance, the relay UE is configured by its serving network via, e.g., common signaling (broadcast system information) or dedicated signaling (unicast dedicated configuration) or pre-configuration for operation outside network coverage with conditions and restrictions or constraints to perform the detecting operation. These include, for examples, the relay UEs needs to monitor HARQ feedback on detected HARQ retransmission starting from n-th HARQ retransmissions (e.g., n=1 or 2 in case maximum 3 HARQ retransmissions may be performed for a TB), minimum priority level of SL transmissions using HARQ, conditions on association between the relay UE and SRC/DST UE or targeted or selected relay UE and/or SRC/DST UEs, and the like, as disclosed herein. Basically, the exemplary embodiments may be applied for enhancing QoS (service continuity) for targeted SL user and service classes.

Step 1. The U2U relay UE 110-3 is configured to detect (e.g., within a monitoring time window), based on at least received SCI in continuous SCI monitoring, a SRC UE 110-1 in its proximity, which has a unicast SL communication with a DST UE 110-2, that the SL communication between the SRC UE and the DST UE is potentially suffering from an SL coverage issue. See block 410. The coverage issue may be caused by one or more of radio path loss due to distance, shadowing, fading channel conditions, and other similar conditions. The SL coverage issue may be determined, for instance, because the relay UE 110-3 detects that the SRC UE 110-1 performs consecutive HARQ retransmissions of a TB to the DST UE 110-2 but the relay UE, upon monitoring corresponding PSFCH from the DST UE, is not able to detect HARQ feedback (NACK) from the DST UE. It is noted that the corresponding PSFCH is derived from the resource allocation used for the HARQ retransmission, as indicated in the SCI from the SRC UE that is received by the relay UE. The monitoring time window, if used, can be for examples a lifetime of the detected HARQ process or a configured time interval.

Step 2. The U2U relay UE, upon detecting the SL coverage issue between the SRC UE and the DST UE in Step 1, may issue an announcement to the DST UE. See block 415. The reason behind this, as opposed to sending a notification to the SRC UE in the first place, is that the relay UE 110-3 knows to a certain extent that it can reach the SRC UE due to SCI received from the SRC UE, but there is no certainty that the relay UE can reach the DST UE. It should be noted that this does not preclude the U2U relay UE from engaging first with the SRC UE, but the DST UE is typically engaged first, for the reasons given previously. The announcement may comprise (see block 420) at least one of a notification of the detected SL coverage issue between the SRC UE and the DST UE by the U2U relay UE or that the SRC UE is reachable to the relay UE. The announcement may alternatively or additionally comprise (see block 425) an SL discovery announcement that the U2U relay UE is available as a U2U relay UE candidate for support of possible path switch for the SRC UE and the DST UE.

The announcement may be considered to be dedicated, in that the announcement concerns the sidelink communications for the SRC UE and DST UE, and not for other UEs. The announcements may therefore be restricted to the SRC UE and/or DST UE, such as using signaling techniques that identify these UEs but not other UEs.

Step 3. In block 430, the U2U relay UE 110-3 determines whether a response was received. The U2U relay UE performs at least one of the following based on whether and what kind of response is received from the DST UE:

Step 3.*a*. In case no response is received from the DST UE (block 430=None), the U2U relay UE may consider its notification as a false alarm or unreachable to the DST UE and then go back to Step 1. It is noted that the false alarm may be due to, e.g., half-duplex issues at the DST UE or that the U2U relay UE is out of SL coverage of the DST UE causing HARQ DTX, as detected at the U2U relay UE. With respect to the half-duplex issues, this means that the DST UE may receive the HARQ transmission from the SRC UE, but due to the need to transmit or receive something else to/from other UE(s) or gNB overlapping in time and in the same frequency band or carrier with the PSFCH, the DST UE may not be able to transmit HARQ feedback to the SRC UE. It is noted that if the SRC UE does receive HARQ information (NACK in this case), the SRC UE may perform step 3.*b*.ii (see below).

Step 3.*b*. In case a response is received from the DST UE in form of SL HARQ feedback (e.g., ACK), the U2U relay UE may issue an announcement (see block 435) to the SRC UE comprising at least one of a notification indicative of at least one of the detected SL coverage issue between the SRC UE and the DST UE, a notification that the DST UE is reachable to the relay UE, or an SL discovery announcement indicating that the U2U relay UE is available as a U2U relay UE candidate for support of possible path switch for the SRC UE and the DST UE. It is noted that the messaging with the HARQ feedback may be used by the DST UE for the case that the DST UE is not able or not allowed to make a decision for the relay selection and path switch decision. The next two steps are performed by the SRC UE 110-1, and the corresponding blocks 440 and 445 in FIG. 4A:

Step 3.*b*.i. The SRC UE may make (see block 440) the decision to select the U2U relay UE for setting up the indirect path 20 for the path switch if the consecutive HARQ retransmission of a TB was triggered by DTX of HARQ feedback from the DST UE. DTX stands for "Discontinuous Transmission", as the DST UE may not receive SCI (and therefore corresponding HARQ transmission) from the SRC UE and therefore does not send a HARQ feedback to the SRC UE, as anticipated by the SRC UE. This results in a HARQ DTX detected at the SRC UE (and monitored by the relay UE in this case).

Step 3.*b*.ii. The SRC UE may not make (see block 445) the decision on switching the direct path 10 to the indirect path 20 via the relay UE 120-3 if the consecutive HARQ (re)transmissions of the TB were triggered by HARQ NACKs from the DST UE.

For these steps with the UE, further detail is provided now. In the current unicast SL, there is an SL radio link failure (RLF) procedure in place in which the SRC UE is responsible for detecting the SL RLF, e.g., based on, among other possibilities, not receiving HARQ feedback from Rx or DST UE, i.e., consecutive HARQ DTX over some configured period of time or monitoring window. However, it may be too late for the SRC UE and DST UE to try finding a suitable U2U relay UE to set up an indirect path only after RLF has been detected because of service interruption.

By contrast, using the scheme above, by having the U2U relay UE candidate proactively present itself to at least the DST UE, this allows at least skipping the finding or discovery process of U2U relay UE candidate. The case that the SRC UE does get HARQ feedback from the DST UE but the U2U relay UE does not is referred to as a false-alarm case herein. In this case, the U2U relay UE will not receive any feedback from the DST UE.

Step 3.*c*. In case a response is received from the DST UE in form of a Direct Communication Request (DCR) for establishing the indirect path 20 (e.g., implying that the DST UE selects the U2U relay UE for setting up the indirect path), the relay UE may establish (see block 450) the relay connection with the DST UE and further initiate (see block 455) a DCR and indirect path establishment with the SRC UE. The relay UE may also notify (see block 460) the SRC UE as in the 3.b option (see block 435), along with the DCR and establishment of the indirect path. It is noted that the messaging with the DCR may be used by the DST UE for the case that the DST UE is able or is allowed to make a decision for the relay selection and path switch decision. It is further noted that the message could be any message for establishing the indirect path, e.g., so the U2U relay UE knows to begin the connection process. The DCR, however, is a straightforward way to accomplish this.

Figure 5:
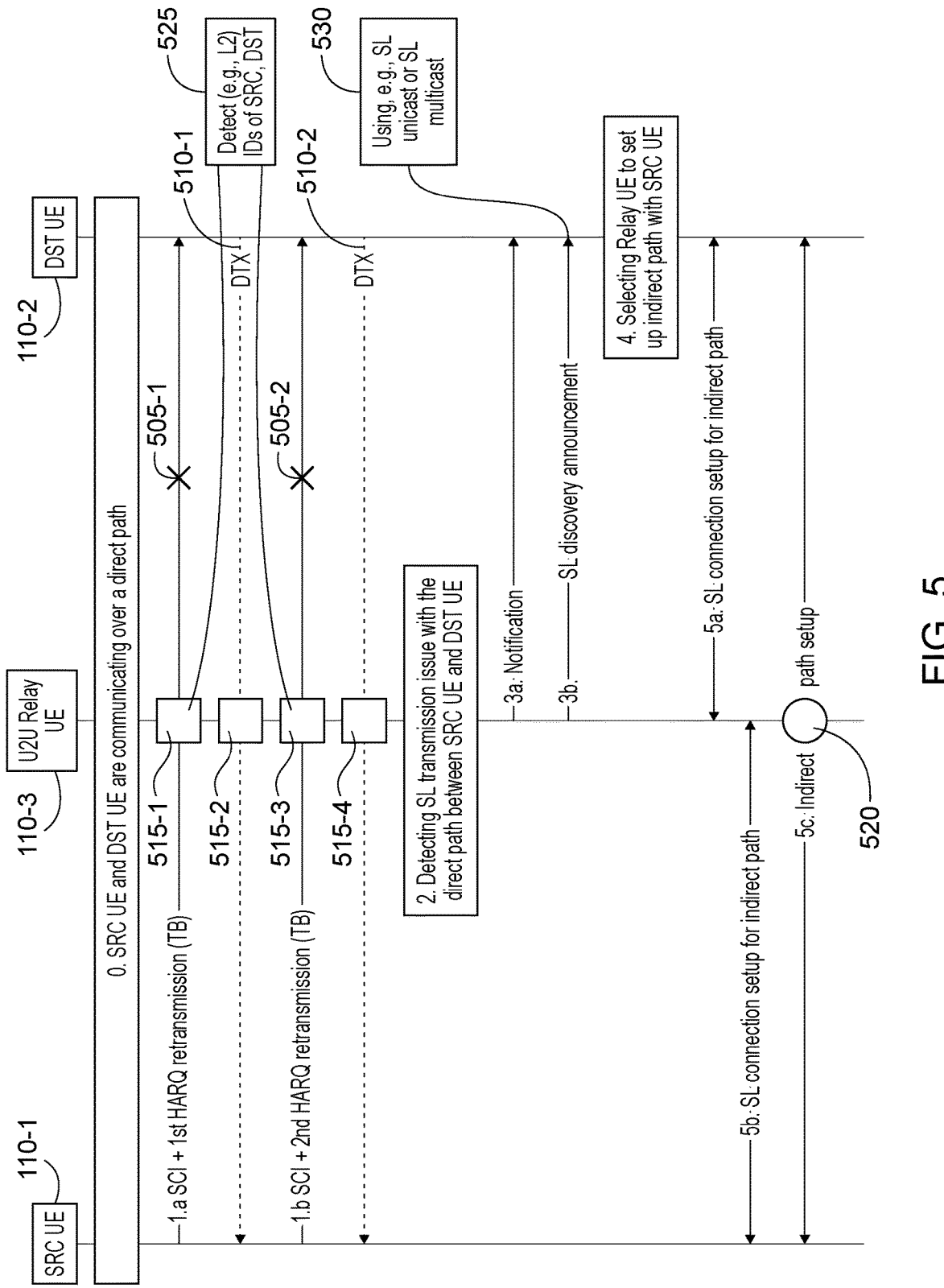
FIG. 5 illustrates a signaling chart for U2U relay UE-initiated dedicated relay discovery for supporting direct-to-indirect path switch.

Referring to FIG. 5, this figure illustrates a signaling chart for U2U relay UE-initiated dedicated relay discovery for supporting direct-to-indirect path switch. In step 0 (zero), the SRC UE 110-1 and the DST UE 110-2 are communicating over a direct path 10. In step 1.*a*, the SRC UE 110-1 sends SCI along with a first (1$^{st}$) HARQ (re)transmission of a transport block (TB). The U2U relay UE 110-3 performs monitoring functions 515, and in monitoring function 515-1, the relay UE 110-3 monitors at least the SCI. Based on the SCI received from the SRC UE 110-1, the relay UE 110-3 is able to determine whether the HARQ transmission is an initial HARQ transmission of a new TB (set by the new data indicator in the SCI) or a HARQ retransmission (set by the redundancy version indicator in the SCI) between the SRC UE and the DST UE. Thus, the relay UE 110-3 is able to determine whether or when the relay UE needs to monitor HARQ feedback from the DST UE to the SRC UE. For example, the relay UE 110-3 only monitors HARQ feedback from the DST UE to the SRC UE starting from the first or second HARQ retransmission. This helps reducing overhead at the relay UE. Reference 505-1 indicates a lost SL transmission (due to an SL coverage issue). Reference 510-1 indicates the DST UE 110-2 does not send HARQ feedback for the lost (e.g., HARQ) SL transmission 505-1, that is a DTX 510-1 (e.g., nothing is transmitted by the DST UE), which the relay UE 110-3 monitors in monitoring function 515-2, and which is detected by the SRC UE 110-1.

In step 1.*b*, the SRC UE 110-1 performs a second (2$^{nd}$) HARQ retransmission of the TB sent in step 1.*a*, and the relay UE 110-3 monitors at least the SCI of this HARQ retransmission with its monitoring function 515-3. This HARQ retransmission again fails to be received at the DST UE 110-2, as indicated by reference 505-2. The DST UE 110-2 causes a HARQ DTX, as indicated by reference 510-2, and this is monitored by the relay UE 110-3 performing its monitoring function 515-4, and is also detected by the SRC UE 110-1.

For the monitoring functions 515-1 and 515-2, the relay UE 110-3 can detect, and therefore know, the (e.g., L2) IDs of both the SRC UE and the DST UE based on received SCI from the SRC UE. See block 525. These IDs can be used later, as described below.

In step 2, the U2U relay UE 110-3 detects the SL transmission issue with the direct path 10 between the SRC UE and the DST UE. In this example, the lack of HARQ responses from the DST UE 110-2 indicate there is an SL coverage issue, indicating a lack of reception of the SL transmission. It is noted that steps 1 and 2 of FIG. 5 may be considered to be part of block 410 of FIG. 4.

In step 3*a*., the relay UE 110-3 sends a notification to the DST UE 110-2. See also blocks 415, 420, and 425 of FIG. 4. In step 3*b*., the relay UE 110-3 sends a SL discovery announcement (see block 425 of FIG. 4) to the DST UE 110-2.

For step 3.*b*, the U2U relay UE 110-3 may use unicast or broadcast on the SL. See block 530. This is due in part to the purpose of the announcement, e.g., whether it is exclusively dedicated to the DST UE and the SRC UE by using unicast (in this case L2 ID of either the DST UE or the SRC UE is used as the DST ID in SCI for sending the announcement by the relay UE to the DST UE or the SRC UE) or in addition to the DST UE and the SRC UE (in this case L2 IDs of both the DST UE and the SRC UE are indicated explicitly in the announcement while a third L2 ID assigned for broadcasting is used as the DST ID in SCI for sending the announcement by the relay UE) other UEs in proximity of the relay UE may also hear the announcement for general relay discovery purpose by using broadcast. Layer 2 is one layer of a protocol stack and typically includes packet data convergence protocol, radio link control, and medium access control sublayers. L2 ID is assigned by upper layer.

The DST UE 110-2 in step 4 selects the relay UE 110-3 to set up the indirect path 20 with the SRC UE 110-1. In step 5*a*., the U2U relay UE 110-3 and DST UE 110-2 perform an SL connection set up for the indirect path 20. See also block 450 of FIG. 4.

For step 5*b*, the SRC UE 110-1 and the U2U relay UE 110-3 perform an SL connection set up for the indirect path 20. See also block 455 of FIG. 4. In step 5*c*, the indirect path 20 has been set up, and the U2U relay UE 110-3 performs U2U relaying functions 520.

Steps 4 and step 5 in FIG. 5 is an example of the DST UE response to the received notification or, i.e., announcement. FIG. 4 covered also other options for possible DST UE responses.

The following are additional examples.

In one embodiment, the relay UE 110-3 may be configured to perform the proposed mechanism for those detected unicast SL communications that are using SL HARQ with feedback and having the priority of SL transmissions above a threshold (e.g., or below a configured priority value, as the lower the value of the priority indicated in SCI, the higher the priority of the respective SL transmission and resource reservation is). This embodiment helps further reduce overhead at the relay UE.

In another embodiment, the relay UE 110-3 may be configured to perform the proposed mechanism for selected UE(s) acting as the SRC UE or the DST UE in detected unicast SL communication in Step 1. For instance, the relay UE may be a member of the same user group as the selected UE(s) or the relay UE may be associated with the selected UE(s) in advance, considering platoon, wearable, or industrial IoT use cases. This embodiment also helps reduce overhead at the relay UE.

In one embodiment, the notification from the relay UE to the DST UE or the SRC UE may be implemented, at least in part, such as those indications included in the notification, on PHY and/or MAC level signaling (SCI and/or MAC CE).

In yet another embodiment, the notification from the relay UE to the DST UE may be implicit, in case the SL discovery message is initiated and transmitted by the relay UE to at least the DST UE in a dedicated fashion.

In one embodiment, the notification in block 420 of FIG. 4 or the SL discovery announcement in block 425 of FIG. 4 from the relay UE 110-3 is sent to at least the DST UE 110-2 using SL unicast, as the relay UE 110-3 is able to detect and use L2 IDs of the SRC UE and the DST UE. This way is considered as dedicated to at least the DST UE.

In another exemplary embodiment, the L2 ID of the SRC UE and, optionally, L2 ID of the DST UE, may be included in the notification in block 420 of FIG. 4 or the SL discovery announcement in block 425 of FIG. 4 from the relay UE, and such announcement may therefore be considered to be dedicated to the DST UE and the SRC UE for a possible direct-to-indirect path switch via the relay UE between the SRC UE and the DST UE.

In one embodiment, the L2 ID of the DST UE and, optionally, the L2 ID of the SRC UE, may be included in the notification (see block 435 of FIG. 4) or the SL discovery announcement (see block 435 of FIG. 4) from the relay UE, and such announcement may therefore be considered to be dedicated to the SRC UE and the DST UE for a possible direct-to-indirect path switch via the relay UE between the SRC UE and the DST UE.

In one embodiment, the SL discovery announcement, which may be considered to be dedicated to the SRC UE and/or the DST UE, may be broadcast where the SL discovery announcement comprises indication(s) of L2 ID(s) of the SRC UE and/or the DST UE.

In one embodiment, the relay UE may determine whether and how to broadcast SL discovery announcements for facilitating U2U relay discovery based on outcome of Step 1 in FIG. 4. For example, the relay UE 110-3 may determine to broadcast SL discovery announcements only when the relay UE 110-3 detects SL transmission issue(s) with at least some unicast SL transmissions in its proximity. The relay UE may also determine and adjust frequency of its SL discovery announcements based on a seriousness level of detected SL transmission issue(s) (e.g., as detected by threshold(s)). For example, the frequency of SL discovery announcements may be higher in case the detected SL transmission issue is due to detected consecutive HARQ feedback of DTX than in case the detected SL transmission issue is based on the number of consecutive HARQ NACKs.

In one embodiment, the relay UE 110-3 may be configured to omit SL discovery announcements (see block 425 or (2) of block 435 of FIG. 4) and instead opt for using the explicit indications of detected SL coverage issues (see block 420 or (1) of block 435 of FIG. 4).

In one embodiment, the indirect path may be added between the SRC UE and DST UE while keeping the existing direct path for multi-path operation. In this case the detection of the issue associated with SL transmissions between the SRC UE and DST UE in Step 1 may be based on the number of NACKs or consecutive NACKs from the DST UE to the SRC UE (above a configured threshold), as received by the relay UE within a configured monitoring time window.

In one embodiment, the U2U relay UE 110-3, based on SCI monitoring, may determine whether the communication between the SRC UE and the DST UE within a monitoring time window is unidirectional (i.e., SCI received from only the SRC UE) or bidirectional (i.e., SCI received from both the SRC UE and the DST UE). It is noted that the description so far has focused on the former which has most likelihood in practice, as the monitoring time window is expected to be short, comparable with lifetime of SL HARQ process used for SL transmission between the SRC UE and the DST UE. For the latter, however likely it is in practice, the following may be considered.

i) The U2U relay UE 110-3 may perform the detection in Step 1 in FIG. 4 (see also block 410 of FIG. 4 and Steps 1 and 2 in FIG. 5) based on monitoring SL transmissions on both directions between the SRC UE and the DST UE (SRC->DST and DST->SRC) in case SL HARQ is used for both directions to avoid the false-alarm situation. In this case, the U2U relay UE may determine the trigger for Step 2 in Section 5 (Step 3 in FIG. 1) based on the number of consecutive HARQ DTXs or NACKs detected on both directions.

ii) The U2U relay UE may issue Step 2 in FIG. 4 (see blocks 415-425) (see also Step 3 in FIG. 5) to either the SRC UE or the DST UE or both.

It is noted that behaviors of the DST UE (and the SRC UE) upon receiving Step 2 in FIG. 4 (see blocks 420/425 of FIG. 4) (see also Step 3 in FIG. 5) may be derived from the above description.

Turning to FIG. 6, this figure is a logic flow diagram performed by a U2U relay UE for U2U relay UE-initiated dedicated relay discovery for supporting direct-to-indirect path switch. This figure also illustrates the operation of an exemplary method, a result of execution of computer program instructions embodied on a computer readable memory, functions performed by logic implemented in hardware, and/or interconnected means for performing functions in accordance with an exemplary embodiment.

In block 610, for a user equipment operating in a system where a source user equipment communicates using sidelink communications with a destination user equipment, the user equipment detects a sidelink coverage issue with the sidelink communications between the source user equipment and the destination user equipment. In block 620, the user equipment sends, in response to the detected sidelink coverage issue, to at least the destination user equipment, an announcement concerning at least one of the sidelink coverage issue or the user equipment being available as a relay user equipment candidate for an indirect path to the destination user equipment.

In the examples that follow, the method of FIG. 6 is referred to as "example 1".

Example 2. The method according to example 1, wherein the announcement comprises at least one of the following:
 a notification of the detected sidelink coverage issue; a notification that the source user equipment is reachable by the user equipment; or
 a sidelink discovery announcement that the user equipment is available as a relay user equipment candidate for the indirect path.

Example 3. The method according to any of examples 1 or 2, further comprising: repeating the detecting and sending, if the user equipment does not receive a response to the announcement from the destination user equipment.

Example 4. The method according to any of examples 1 or 2, further comprising: receiving a response from the destination user equipment comprising sidelink hybrid automatic repeat request feedback, and sending by the user equipment another announcement to the source user equipment concerning at least one of the sidelink coverage issue or the user equipment being available as a relay user equipment candidate for an indirect path.

Example 5. The method according to example 4, wherein the other announcement comprises at least one of the following:
 a notification of the detected sidelink coverage issue; a notification that the destination user equipment is reachable by the user equipment; or
 a sidelink discovery announcement that the user equipment is available as a relay user equipment candidate for the indirect path.

Example 6. The method according to any of examples 1, 2, 4 or 5, further comprising:
 receiving a response from the destination user equipment comprising a message for establishing the indirect path;
 establishing a sidelink connection between the user equipment and the destination user equipment as part of the indirect path; and sending a message from the user equipment to the source user equipment to establish a sidelink connection between the user equipment and the source user equipment as part of the indirect path.

Example 7. The method according to example 6, wherein the message for establishing the indirect path comprises a direct communication request message.

Example 8. wherein the sending of the announcement comprises layer 2 identifiers of the source user equipment and the destination user equipment.

Example 9. The method according to any of examples 1 to 8, wherein the sending uses at least one of sidelink unicast or sidelink broadcast.

Referring to FIG. 7, this figure is a logic flow diagram performed by a DST UE for U2U relay UE-initiated dedicated relay discovery for supporting direct-to-indirect path switch. This figure additionally illustrates the operation of an exemplary method, a result of execution of computer program instructions embodied on a computer readable memory, functions performed by logic implemented in hardware, and/or interconnected means for performing functions in accordance with an exemplary embodiment.

For a destination user equipment operating in a system where a source user equipment communicates using sidelink communications with the destination user equipment, The destination user equipment receives in block 710, from a user equipment, an announcement concerning at least one of a sidelink coverage issue with the sidelink communications between the source user equipment and the destination user equipment or the user equipment being available as a relay user equipment candidate for an indirect path. Block 720 has the destination user equipment communicating with the user equipment to set up and use the indirect path.

In the examples below, the method of FIG. 7 is referred to as "example 9".

Example 10. The method according to example 9, wherein the communicating comprises sending a response comprising sidelink hybrid automatic repeat request feedback from the destination user equipment to the user equipment.

Example 11. The method according to example 9, wherein the communicating comprises sending from the destination user equipment to the user equipment a message for establishing the indirect path.

Example 12. The method according to example 11, wherein the message for establishing the indirect path comprises a direct communication request message.

Example 13. A computer program, comprising code for performing the methods of any of examples 1 to 12, when the computer program is run on a computer.

Example 14. The computer program according to example 13, wherein the computer program is a computer program product comprising a computer-readable medium bearing computer program code embodied therein for use with the computer.

Example 15. The computer program according to example 13, wherein the computer program is directly loadable into an internal memory of the computer.

Example 16. An apparatus, comprising means for performing:

for a user equipment operating in a system where a source user equipment communicates using sidelink communications with a destination user equipment, detecting by the user equipment a sidelink coverage issue with the sidelink communications between the source user equipment and the destination user equipment; and sending, by the user equipment in response to the detected sidelink coverage issue, to at least the destination user equipment, an announcement concerning at least one of the sidelink coverage issue or the user equipment being available as a relay user equipment candidate for an indirect path to the destination user equipment.

Example 17. The apparatus according to example 16, wherein the announcement comprises at least one of the following:

a notification of the detected sidelink coverage issue; a notification that the source user equipment is reachable by the user equipment; or a sidelink discovery announcement that the user equipment is available as a relay user equipment candidate for the indirect path.

Example 18. The apparatus according to any of examples 16 or 17, further comprising: repeating the detecting and sending, if the user equipment does not receive a response to the announcement from the destination user equipment.

Example 19. The apparatus according to any of examples 16 or 17, further comprising means for performing: receiving a response from the destination user equipment comprising sidelink hybrid automatic repeat request feedback, and sending by the user equipment another announcement to the source user equipment concerning at least one of the sidelink coverage issue or the user equipment being available as a relay user equipment candidate for an indirect path.

Example 20. The apparatus according to example 19, wherein the other announcement comprises at least one of the following:

a notification of the detected sidelink coverage issue; a notification that the destination user equipment is reachable by the user equipment; or a sidelink discovery announcement that the user equipment is available as a relay user equipment candidate for the indirect path.

Example 21. The apparatus according to any of examples 16, 17, 19, or 20, further comprising means for performing:

receiving a response from the destination user equipment comprising a message for establishing the indirect path;

establishing a sidelink connection between the user equipment and the destination user equipment as part of the indirect path; and sending a message from the user equipment to the source user equipment to establish a sidelink connection between the user equipment and the source user equipment as part of the indirect path.

Example 22. The apparatus according to example 21, wherein the message for establishing the indirect path comprises a direct communication request message.

Example 23. The apparatus according to any of examples 16 to 22, wherein the sending of the announcement comprises layer 2 identifiers of the source user equipment and the destination user equipment.

Example 24. The apparatus according to example 23, wherein the sending uses at least one of sidelink unicast or sidelink broadcast.

Example 25. An apparatus, comprising means for performing:

for a destination user equipment operating in a system where a source user equipment communicates using sidelink communications with the destination user equipment, receiving, by the destination user equipment and from a user equipment, an announcement concerning at least one of a sidelink coverage issue with the sidelink communications between the source user equipment and the destination user equipment or the user equipment being available as a relay user equipment candidate for an indirect path; and communicating by the destination user equipment with the user equipment to set up and use the indirect path.

Example 26. The apparatus according to example 25, wherein the communicating comprises sending a response comprising sidelink hybrid automatic repeat request feedback from the destination user equipment to the user equipment.

Example 27. The apparatus according to example 25, wherein the communicating comprises sending from the destination user equipment to the user equipment a message for establishing the indirect path.

Example 28. The apparatus according to example 27, wherein the message for establishing the indirect path comprises a direct communication request message.

Example 29. The apparatus of any preceding apparatus example, wherein the means comprises:

at least one processor; and at least one memory including computer program code, the at least one memory and computer program code configured to, with the at least one processor, cause the performance of the apparatus.

Example 30. An apparatus, comprising:

one or more processors; and one or more memories including computer program code, wherein the one or more memories and the computer program code are configured, with the one or more processors, to cause the apparatus to:

for a user equipment operating in a system where a source user equipment communicates using sidelink communications with a destination user equipment, detect the user equipment a sidelink coverage issue with the sidelink communications between the source user equipment and the destination user equipment; and send, by the user equipment in response to the detected sidelink coverage issue, to at least the destination user equipment, an announcement concerning at least one of the sidelink coverage issue or the user equipment being available as a relay user equipment candidate for an indirect path to the destination user equipment.

Example 31. An apparatus, comprising:

one or more processors; and one or more memories including computer program code, wherein the one or more memories and the computer program code are configured, with the one or more processors, to cause the apparatus to:

for a destination user equipment operating in a system where a source user equipment communicates using sidelink communications with the destination user equipment, receive, by the destination user equipment and from a user equipment, an announcement concerning at least one of a sidelink coverage issue with the sidelink communications between the source user equipment and the destination user equipment or the user equipment being available as a relay user equipment candidate for an indirect path; and communicate by the destination user equipment with the user equipment to set up and use the indirect path.

Example 32. A computer program product comprising a computer-readable storage medium bearing computer program code embodied therein for use with a computer, the computer program code comprising:

code, for a user equipment operating in a system where a source user equipment communicates using sidelink communications with a destination user equipment, for detecting by the user equipment a sidelink coverage issue with the sidelink communications between the source user equipment and the destination user equipment; and code for sending, by the user equipment in response to the detected sidelink coverage issue, to at least the destination user equipment, an announcement concerning at least one of the sidelink coverage issue or the user equipment being available as a relay user equipment candidate for an indirect path to the destination user equipment.

Example 33. A computer program product comprising a computer-readable storage medium bearing computer program code embodied therein for use with a computer, the computer program code comprising:

code, for a destination user equipment operating in a system where a source user equipment communicates using sidelink communications with the destination user equipment, for receiving, by the destination user equipment and from a user equipment, an announcement concerning at least one of a sidelink coverage issue with the sidelink communications between the source user equipment and the destination user equipment or the user equipment being available as a relay user equipment candidate for an indirect path; and code for communicating by the destination user equipment with the user equipment to set up and use the indirect path.

Without in any way limiting the scope, interpretation, or application of the claims appearing below, technical effects of one or more of the example embodiments disclosed herein include the following:

i) These allow for a quick and efficient U2U relay discovery and selection for supporting path switch from direct path to indirect path or addition of an indirect path to the existing direct path between a SRC UE and a DST UE;

ii) These complement the existing SRC UE or DST UE initiated mechanism well without causing significant standardization impact; and/or iii) Certain embodiments may be implemented without standardization impact, as pointed out above.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1A. A computer-readable medium may comprise a computer-readable storage medium (e.g., memories 155 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

$1^{st}$ first
$2^{nd}$ second
3GPP third generation partnership project
5G fifth generation
5GC 5G core network
AMF access and mobility management function
CBR Channel Busy Ratio
CU central unit
DCR Direct Communication Request
DST destination
DTX discontinuous transmission
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FC Flow Control
HARQ Hybrid Automatic Repeat Request
gNB (or gNodeB) base station for 5G/NR, i.e., a node providing NR user plane and control plane protocol terminations towards the UE, and connected via the NG interface to the 5GC
ID identification
I/F interface
IoT Internet of Things

20

IUC inter-UE coordination
L2 layer 2
LTE long term evolution
MAC medium access control
MAC CE MAC control element
MCS Modulation and Coding Scheme
MME mobility management entity
ng or NG next generation
ng-eNB or NG-eNB next generation eNB
NR new radio
N/W or NW network
PDCP packet data convergence protocol
PDP Packet Delay Budget
PHY physical layer
ProSe proximity service
PSCCH Physical Sidelink Control Channel
PSCFCH Physical Sidelink Feedback Channel
PSSCH Physical Sidelink Shared Channel
QoS Quality of Service
RAN radio access network
Rel release
RLC radio link control
RRH remote radio head
RRC radio resource control
RU radio unit
Rx receiver
SCI Sidelink Control Information
SCH shared channel
SDAP service data adaptation protocol
SGW serving gateway
SL sidelink
SL-SR sidelink-scheduling request
SMF session management function
SRC source
TB transport block
TBS transport block size
TS technical specification
Tx transmitter
U2N UE to network
U2U UE to UE
UAI UE assistance information
UE user equipment (e.g., a wireless, typically mobile device)
UPF user plane function
V2X vehicle to everything

What is claimed is:

1. A method performed by a relay user equipment (UE) operating in a system where a source UE communicates using sidelink communications with a destination UE, the method comprising:

receiving, by the relay UE from a network node, a configuration to perform a detecting operation;

in response to receiving the configuration, detecting a sidelink coverage issue with the sidelink communications between the source UE and the destination UE by:

monitoring Sidelink Control Information (SCI) transmitted by the source UE for one or more Hybrid Automatic Repeat Request (HARQ) retransmissions directed to the destination UE, obtaining, from the monitored SCI, layer 2 identifiers of the source UE and the destination UE, and determining that the source UE has performed a threshold number of consecutive HARQ retransmissions for which the relay UE fails to detect corresponding sidelink HARQ feedback from the destination UE within a monitoring time window;

in response to detecting the sidelink coverage issue, sending, by the relay UE to at least the destination UE, a first announcement including the obtained layer 2 identifiers of the source UE and the destination UE, wherein the first announcement is sent using sidelink unicast, and wherein the first announcement comprises:

a notification of the detected sidelink coverage issue, and a sidelink discovery announcement that the relay UE is available as a relay UE candidate for an indirect path between the source UE and the destination UE;

in response to sending the first announcement, receiving, from the destination UE, one of: a first response comprising a direct communication request (DCR) message for establishing the indirect path, and a second response comprising a sidelink HARQ feedback;

in response to receiving the DCR message, establishing the indirect path by:

establishing a first sidelink connection between the relay UE and the destination UE; and sending, from the relay UE to the source UE, the DCR message to establish a second sidelink connection between the relay UE and the source UE; and in response to receiving the sidelink HARQ feedback, sending a second announcement to the source UE, wherein the second announcement comprises:

a notification of the detected sidelink coverage issue, a notification that the destination UE is reachable by the relay UE, and a sidelink discovery announcement that the relay UE is available as the relay UE candidate for the indirect path; and based on sending the second announcement, causing the source UE to determine whether to switch to the indirect path based on whether the one or more HARQ retransmissions were triggered by a Discontinuous Transmission (DTX) or a Negative Acknowledgement (NACK).

2. The method according to claim 1, further comprising:

in response to sending the first announcement, when neither the first response nor the second response is received from the destination UE, performing:

repeating the detection of the sidelink coverage issue, and resending, the first announcement to the destination UE.

3. A relay user equipment (UE), comprising:

one or more processors; and one or more memories storing instructions that, when executed by the one or more processors, cause the UE, operating in a system where a source UE communicates using sidelink communication with a destination UE, to perform:

receiving, from a network node, a configuration to perform a detecting operation;

in response to receiving the configuration, detecting, by the relay UE, a sidelink coverage issue with the sidelink communications between the source UE and the destination UE by:

monitoring Sidelink Control Information (SCI) transmitted by the source UE for one or more Hybrid Automatic Repeat Request (HARQ) retransmissions directed to the destination UE, obtaining, from the monitored SCI, layer 2 identifiers of the source UE and the destination UE, and determining that the source UE performs the one or more HARQ retransmissions for which the UE fails to detect corresponding HARQ feedback from the destination UE;

in response to detecting the sidelink coverage issue, sending, by the relay UE, to at least the destination UE, a first announcement including the obtained layer 2 identifiers of the source UE and the destination UE, wherein the first announcement is sent using sidelink unicast and the first announcement comprises:

a notification of the detected sidelink coverage issue, and a sidelink discovery announcement that the relay UE is available as a relay UE candidate for an indirect path between the source UE and the destination UE;

in response to sending the first announcement, receiving, from the destination UE, a first response comprising a direct communication request (DCR) message for establishing the indirect path;

in response to receiving the DCR message, establishing the indirect path by:

establishing a first sidelink connection between the relay UE and the destination UE; and sending, from the relay UE to the source UE, the DCR message to establish a second sidelink connection between the relay UE and the source UE.

4. The apparatus according to claim 3, wherein, in response to the first announcement, when neither the first response nor the second response is received from the destination UE, the one or more memories further store instructions that, when executed by the one or more processors, cause the relay UE at least to perform:

repeating the detection of the sidelink coverage issue, and resending the first announcement to the destination UE.

5. A system comprising:

a relay user equipment (UE), comprising:

a first processor; and one or more memories storing instructions that, when executed by the first processor, cause the relay UE to perform at least the following:

receiving, from a network node, a configuration to perform a detecting operation;

in response to receiving the configuration, detecting, by the relay UE, a sidelink coverage issue with the sidelink communications between the source UE and the destination UE by:

monitoring Sidelink Control Information (SCI) transmitted by the source UE for one or more Hybrid Automatic Repeat Request (HARQ) retransmissions directed to the destination UE, obtaining, from the monitored SCI, layer 2 identifiers of the source UE and the destination UE, and determining that the source UE performs the one or more HARQ retransmissions for which the UE fails to detect corresponding HARQ feedback from the destination UE;

in response to detecting the sidelink coverage issue, sending, by the relay UE, to at least the destination UE, a first announcement including the obtained layer 2 of the source UE and the destination UE, wherein the first announcement is sent using sidelink unicast and the first announcement comprises:

a notification of the detected sidelink coverage issue, and a sidelink discovery announcement that the relay UE is available as a relay UE candidate for an indirect path between the source UE and the destination UE;

in response to sending the first announcement, receiving, from the destination UE, one of: a first response comprising a direct communication request (DCR) message for establishing the indirect path, and a second response comprising a sidelink HARQ feedback;

in response to receiving the DCR message, establishing the indirect path by:

establishing a first sidelink connection between the relay UE and the destination UE; and sending, from the relay UE to the source UE, the DCR message to establish a second sidelink connection between the relay UE and the source UE; and a destination (UE), comprising:

a second processor; and one or more additional memories storing instructions that, when executed by the second processor, cause the destination UE to perform at least the following:

receiving from the relay UE, the first announcement; and in response to receiving the first announcement, sending, to the relay UE, the first response comprising the DCR message for establishing the indirect path between the source UE and the destination UE via the relay UE, and establishing a sidelink connection with the relay UE as part of the indirect path; and in response to receiving the first announcement, sending, by the destination UE to the relay UE, the second response comprising a sidelink Hybrid Automatic Repeat Request (HARQ) feedback.

* * * * *